(12) United States Patent
Mihara

(10) Patent No.: US 8,763,145 B2
(45) Date of Patent: Jun. 24, 2014

(54) CLOUD SYSTEM, LICENSE MANAGEMENT METHOD FOR CLOUD SERVICE

(75) Inventor: Makoto Mihara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 143 days.

(21) Appl. No.: 13/461,664

(22) Filed: May 1, 2012

(65) Prior Publication Data

US 2012/0317621 A1  Dec. 13, 2012

(30) Foreign Application Priority Data

Jun. 9, 2011  (JP) ................. 2011-129546

(51) Int. Cl.
*G06F 21/00* (2013.01)
*G06F 21/10* (2013.01)

(52) U.S. Cl.
CPC ............ *G06F 21/105* (2013.01); *G06F 21/10* (2013.01)
USPC ............................................. 726/26; 726/27

(58) Field of Classification Search
CPC ............................. G06F 21/10; G06F 21/105
See application file for complete search history.

(56) References Cited

U.S. PATENT DOCUMENTS

| 8,291,490 | B1 * | 10/2012 | Ahmed et al. ................. 726/17 |
| 2006/0168451 | A1 * | 7/2006 | Ishibashi et al. ............. 713/176 |
| 2008/0201701 | A1 * | 8/2008 | Hofhansl et al. ............. 717/168 |
| 2009/0187929 | A1 * | 7/2009 | Kushwaha et al. ........... 719/330 |
| 2009/0288084 | A1 * | 11/2009 | Astete et al. ...................... 718/1 |
| 2010/0162036 | A1 * | 6/2010 | Linden et al. ..................... 714/4 |
| 2011/0023123 | A1 * | 1/2011 | King et al. ...................... 726/26 |
| 2011/0035785 | A1 | 2/2011 | Mihara |
| 2011/0261398 | A1 | 10/2011 | Mihara et al. |
| 2012/0117626 | A1 * | 5/2012 | Yates et al. ......................... 726/4 |

FOREIGN PATENT DOCUMENTS

JP  2002-333928  11/2002

* cited by examiner

*Primary Examiner* — Matthew Henning
(74) *Attorney, Agent, or Firm* — Fitzpatrick, Cella, Harper & Scinto

(57) ABSTRACT

A screen to be presented to a customer administrator is generated according to the license status. Also, as a license status, a processing progress status is provided in which the customer administrator is prohibited to perform operations during asynchronous license status change processing.

8 Claims, 19 Drawing Sheets

F I G. 3
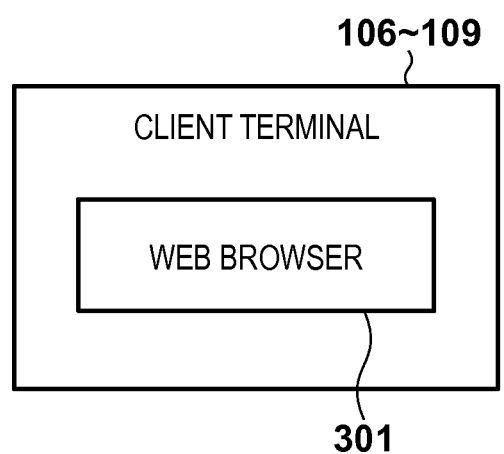

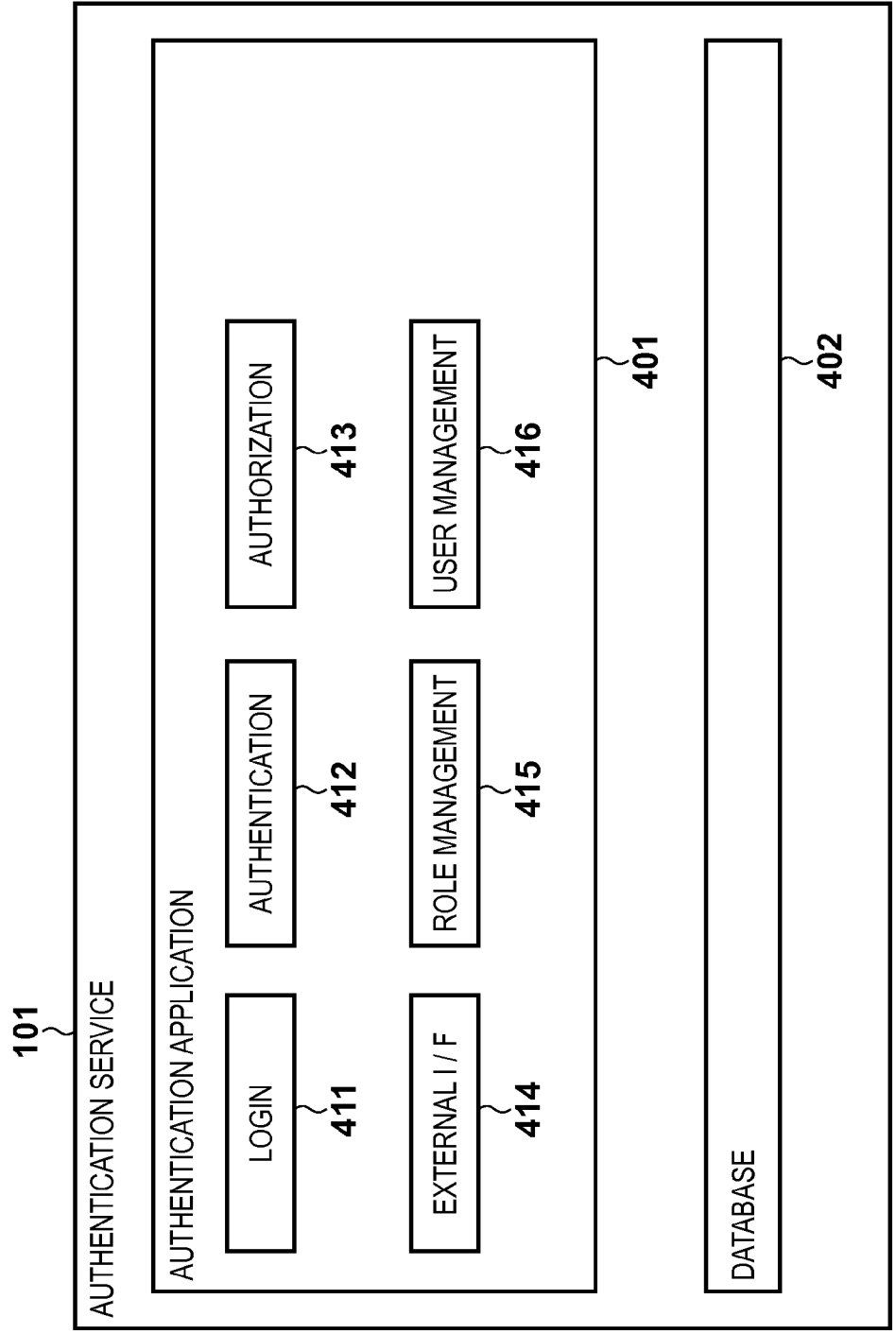

| USER ID | PASSWORD | TENANT ID | SURNAME | GIVEN NAME | OWNED ROLE |
|---|---|---|---|---|---|
| distributorAdmin@101AA | 4hfq9ph8ny | 101AA | DISTRIBUTOR ADMINISTRATOR | DISTRIBUTOR ADMINISTRATOR | distributor, distributorAdmin —521 |
| customerAdmin@1002AA | 3qtyq8vyp | 1002AA | CUSTOMER ADMINISTRATOR | CUSTOMER ADMINISTRATOR | customer, customerAdmin —522 |
| customer1@1002AA | E9tuqpnt34 | 1002AA | YAMADA | TARO | customer, formUser —523 |
| customer2@1002AA | 3517vejq;93 | 1002AA | YAMADA | HANAKO | customer, formAdmin —524 |

| ROLE ID | ACCESSIBLE URL |
|---|---|
| distributor | https://biz/tenantmanagement/* —541 |
| distributorAdmin | https://biz/distributorusermanagement/* —542 |
| customer | https://biz/personal/* —543 |
| customerAdmin | https://biz/usermanagement/* —544 |
| formAdmin | https://form/setting/* —545 |
| formTrialAdmin | https://form/setting/* —546 |
| formInvldAdmin | —547 |
| formUser | https://form/print/* —548 |
| formTrialUser | https://form/print/basic/* —549 |
| formInvldUser | —550 |

| LICENSE SETTING | | | | | |
|---|---|---|---|---|---|
| | SERVICE NAME (911) | LICENSE STATUS (912) | NUMBER OF LICENSES (913) | NUMBER OF LICENSES IN USE (914) | SCHEDULE (915) |
| 901 | FORMS SERVICE | UNLICENSED | -- | -- | START DATE OF TRIAL : --<br>EXPIRATION DATE OF TRIAL : --<br>START DATE OF PERMANENT LICENSE : --<br>EXPIRATION DATE OF PERMANENT LICENSE : -- |
| 903 | ☐ ADD LICENSE | [TRIAL ▸] | [    ] | -- | EXPIRATION DATE OF TRIAL : [▦]<br>(YYYY/MM/DD) |
| 902 | PRINT SERVICE | UNLICENSED | -- | -- | START DATE OF TRIAL : --<br>EXPIRATION DATE OF TRIAL : --<br>START DATE OF PERMANENT LICENSE : --<br>EXPIRATION DATE OF PERMANENT LICENSE : -- |
| 904 | ☐ ADD LICENSE | [TRIAL ▸] | [    ] | -- | EXPIRATION DATE OF TRIAL : [▦]<br>(YYYY/MM/DD) |

F I G. 11A

| LICENSE ID 1111 | PRODUCT ID 1112 | TENANT ID 1113 | LICENSE STATUS 1114 | NUMBER OF LICENSES 1115 | START DATE 1116 | EXPIRATION DATE 1117 |
|---|---|---|---|---|---|---|
| 1 | form | 1002AA | PERMANENT | 15 | 2011/3/10 | |
| 2 | print | 1002AA | TRIAL | 40 | 2011/4/1 | 2011/4/30 |
| 3 | form | 1003AA | UNLICENSED | 0 | | |
| 4 | print | 1003AA | SWITCHING TO PERMANENT LICENSE | 20 | 2011/4/15 | |

F I G. 11B

| ROLE ID 1131 | RELATED ROLE ID 1132 | PRODUCT ID 1133 | LICENSE TYPE 1134 | CONSUMPTION 1135 | DISPLAYED NAME 1136 |
|---|---|---|---|---|---|
| formAdmin | formInvldAdmin | form | PERMANENT | 0 | ADMINISTRATIVE |
| formTrialAdmin | formInvldAdmin | form | TRIAL | 0 | ADMINISTRATIVE |
| formUser | formInvldUser | form | PERMANENT | 1 | GENERAL |
| formTrialUser | formInvldUser | form | TRIAL | 1 | GENERAL |

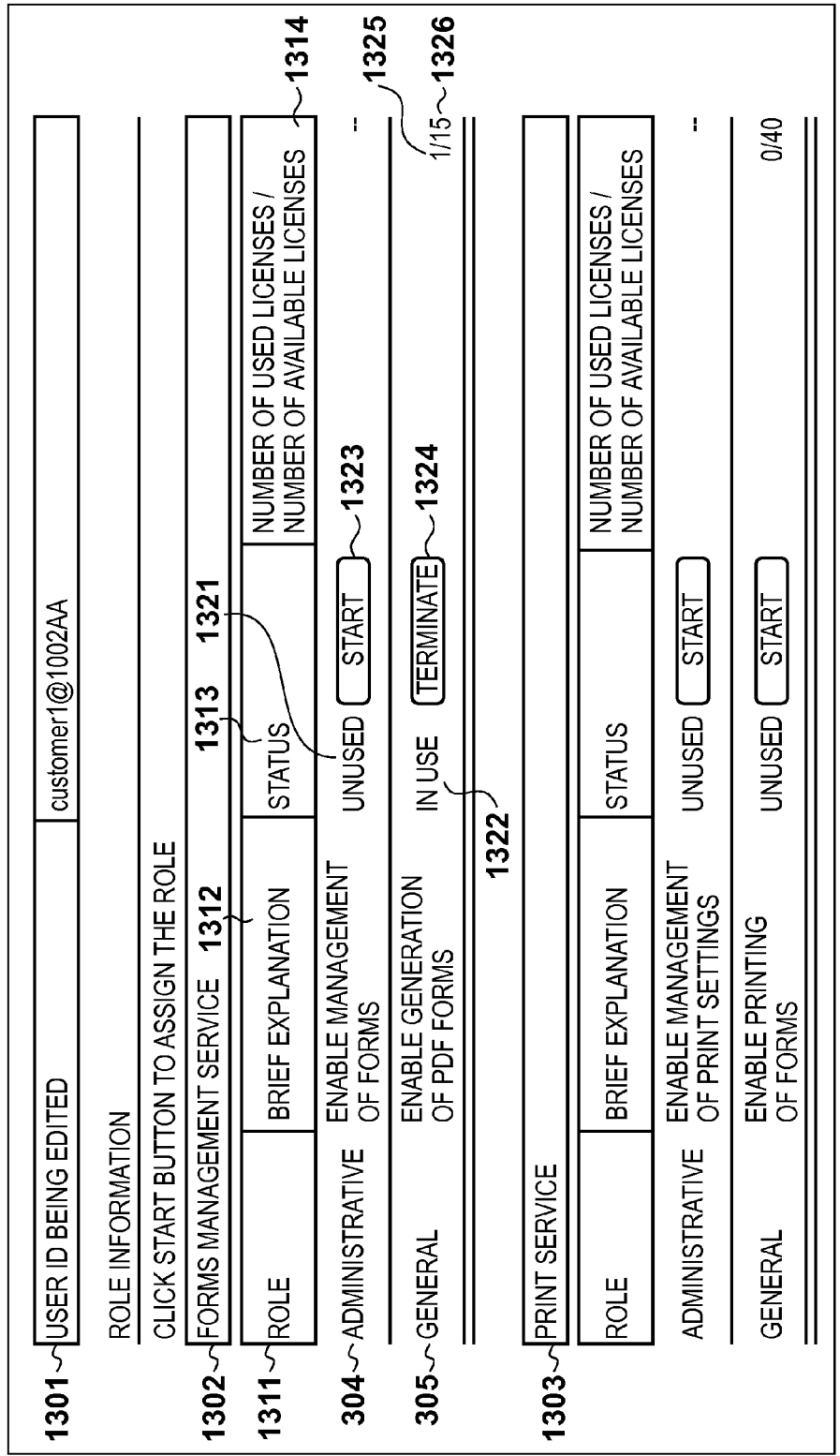

FIG. 15A

| FORMS MANAGEMENT SERVICE | | | |
|---|---|---|---|
| ROLE | BRIEF EXPLANATION | STATUS | NUMBER OF USED LICENSES / NUMBER OF AVAILABLE LICENSES |
| ADMINISTRATIVE | ENABLE MANAGEMENT OF FORMS | UNUSED [START] | -- |
| 1501~GENERAL | ENABLE GENERATION OF PDF FORMS | UNUSED [START]~1502 | 1/15 |

FIG. 15B

| FORMS MANAGEMENT SERVICE | | | |
|---|---|---|---|
| | UNABLE TO ASSIGN [GENERAL] ROLE DUE TO THE NUMBER OF LICENSES IN USE REACHING MAXIMUM ~1512 | | |
| ROLE | BRIEF EXPLANATION | STATUS | NUMBER OF USED LICENSES / NUMBER OF AVAILABLE LICENSES |
| ADMINISTRATIVE | ENABLE MANAGEMENT OF FORMS | UNUSED [START] | -- |
| 1511~GENERAL | ENABLE GENERATION OF PDF FORMS | UNUSED [START]~1513 | 15/15 |

FIG. 15C

FORMS MANAGEMENT SERVICE

UNABLE TO PERFORM OPERATION DURING LICENSE SWITCHING STATUS. RETRY LATER. ~1521

| ROLE | BRIEF EXPLANATION | STATUS | NUMBER OF USED LICENSES / NUMBER OF AVAILABLE LICENSES |
|---|---|---|---|
| ADMINISTRATIVE | ENABLE MANAGEMENT OF FORMS | UNUSED [START] ~1522 | -- |
| GENERAL | ENABLE GENERATION OF PDF FORMS | UNUSED [START] ~1523 | -/15 |

FIG. 15D

USER ID BEING EDITED | customer1@1002AA

ROLE INFORMATION

CLICK START BUTTON TO ASSIGN THE ROLE

PRINT SERVICE

| ROLE | BRIEF EXPLANATION | STATUS | NUMBER OF USED LICENSES / NUMBER OF AVAILABLE LICENSES |
|---|---|---|---|
| ADMINISTRATIVE | ENABLE MANAGEMENT OF PRINT SETTINGS | UNUSED [START] | -- |
| GENERAL | ENABLE PRINTING OF FORMS | UNUSED [START] | 0/40 |

# CLOUD SYSTEM, LICENSE MANAGEMENT METHOD FOR CLOUD SERVICE

BACKGROUND OF THE INVENTION

1. Field of the Invention

The present invention relates to a cloud system and a license management method for cloud services, and more particularly to a license management method for performing access control for various cloud services based on, for example, user license information.

2. Description of the Related Art

In recent years, various cloud services are provided over the Internet. For these services, an authentication system is generally provided as a security measure that performs, for example, maintenance and management of IDs and passwords as well as access control. Accordingly, users generally purchase licenses for each service that they want before they use the service. Japanese Patent Laid-Open No. 2002-333928 discloses a service operation method that performs authentication and license management for various services. According to this service operation method, access control is performed based on license information managed for each service, and control is performed for each service so as to decide whether or not the service is available.

With the conventional technique, however, because the access control based on the license information is performed centrally by a cloud server, it is difficult for an administrator user or a customer licensed for a service to further assign access rights to general users or customers who use the service, based on the license. For example, an administrator user or a customer who has been granted a trial license for testing a service by the server enables general users to use the trial license. The general users can thereby enforce access rights assigned to the trial license. However, even if, for example, the administrator user wants to assign different access rights to different general users, it is difficult to control rights included in the granted license on a user-by-user basis.

The increase in the types of licenses requires the server to carry out various types of processing such as license switch processing for switching from a trial license to a permanent license. At this time, the access rights assigned to individual users need to be sequentially updated in the license switch processing. Such processing, however, requires a very long time in a system used by a large number of users such as a cloud service. Accordingly, it has been difficult to update access rights assigned to individual users in synchronization with the license switch processing. Also, for the same reason, it has been difficult to update the access rights of individual users in synchronization with the changes in the license status such as termination and recovery of license.

SUMMARY OF THE INVENTION

The present invention has been made to solve the above-described problems. Specifically, it is an object of the present invention to assign an access right for a license to each customer user who exercises the license. It is another object of the present invention to update the access rights assigned to the users asynchronously to the processing for switching the license or changing the license status, without causing disagreement between the license and the access rights.

The present invention has been conceived in view of the conventional technology described above, and has the following configuration.

Specifically, the present invention provides one or more servers for providing services to clients including: a storage unit which stores a user management table in which a tenant licensed to provide a service, a user who belongs to the tenant, and a role indicating an access right of the user to the licensed service are registered; a user interface unit which provides a user interface for setting a role for the user in response to a request from the client; and an update unit which updates the user management table in accordance with a role set for the user via the user interface.

According to the present invention, an administrator user or a licensed customer can easily assign access rights for general users managed by the administrator user. Furthermore, the access rights given to the users can be updated in response to a change in the license status or switching of the license while agreement with the license is maintained.

Further features of the present invention will become apparent from the following description of exemplary embodiments with reference to the attached drawings.

BRIEF DESCRIPTION OF THE DRAWINGS

FIG. 3 is a system configuration diagram of a client terminal according to the embodiment of the present invention.

FIG. 4 is a system configuration diagram of an authentication service according to the embodiment of the present invention.

FIGS. 5A and 5B show examples of data managed by the authentication service according to the embodiment of the present invention.

FIG. 9 shows a screen used when a distributor user assigns licenses for a tenant according to the embodiment of the present invention.

FIGS. 11A and 11B show examples of data managed by the business support service according to the embodiment of the present invention.

FIG. 13 shows a screen used when a customer administrator user performs assignment and cancellation of product roles for a general user according to the embodiment of the present invention.

FIGS. 15A, 15B, 15C and 15D show variations of the display shown in FIG. 13 corresponding to various license statuses according to the embodiment of the present invention.

DESCRIPTION OF THE EMBODIMENTS

Hereinafter, a best mode for carrying out the present invention will be described with reference to the drawings. The term "service" used in the present embodiment refers not only to a function provided to clients, but also to resources and the like required by a server computer to provide the service. For example, "authentication service" refers not only to the function of authenticating clients, but also to hardware resources and software resources consumed by a server computer that provides the authentication service to provide the authentication service. Accordingly, in the following description, "service" may be replaced by "server". The reason that the term "server" is not used in the present embodiment is because there are cases where a single service is provided by one or more servers, or where a plurality of services are provided by a single server, and we think it is more suitable to use a word with an abstract definition such as "service". Also, "cloud system" refers to a system with which clients receive services from a server via the Internet, and it may also be referred to as a "client server system" targeted to unspecified clients.

Figure 1:
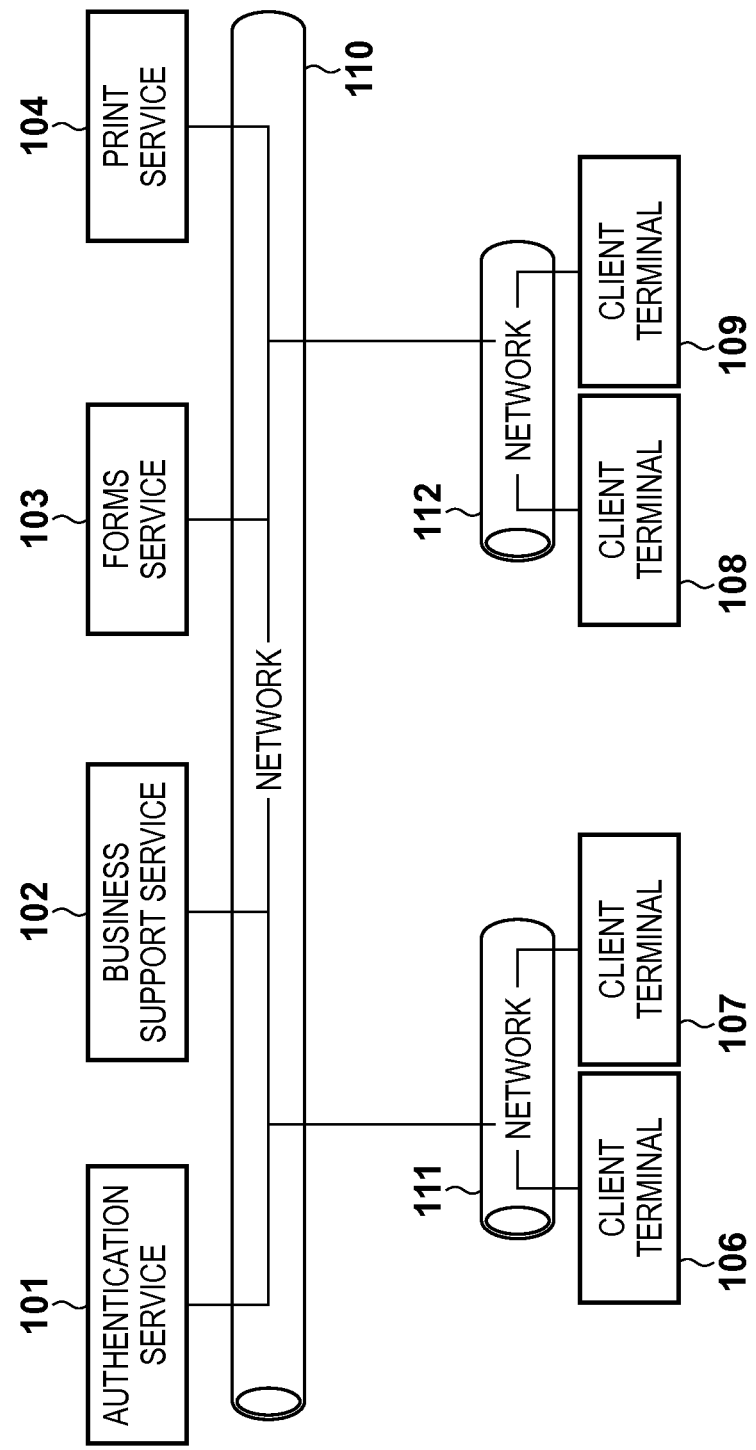
FIG. 1 is a diagram showing an overall configuration of a cloud system according to an embodiment of the present invention.

<FIG. 1: Overall Configuration of Cloud System>

FIG. 1 is a diagram showing an overall configuration of a cloud system according to an embodiment of the present invention. As shown in FIG. 1, an authentication service 101, a business support service 102, a forms service 103, a print service (document print service) 104 and client terminals 106 to 109 are connected via networks 110 to 112. In FIG. 1, it is assumed that a plurality of client terminals (the client terminals 106 to 109) are connected. The networks 110 to 112 are separate networks such as a LAN (for example, the Internet), a WAN, a telephone line, a dedicated digital line, an ATM line, a frame-relay line, a cable television line and a wireless data broadcast line, and these networks are connected to each other. There is no limitation on the networks 110 to 112 as long as they are capable of transmitting and receiving data. With a general cloud service, the network 110 can be the Internet, and the networks 111 and 112 can be a corporate network and a service provider network. The authentication service 101, the business support service 102, the forms service 103 and the print service 104 are generally executed by a server computer, and the group of services provide the cloud service to users. Accordingly, in the present application, each server is referred to as a "service". The cloud service is provided from a server to a client in response to a request from the client to the server via the HTTP. To this end, the server executes an application program for providing the service. In particular, such an application program that provides a service in response to a request from a client is herein referred to as a "web application". The web application may, in some cases, pass a part of processing to a back-end program. The servers may be separate servers or may be connected to any of the servers with a common local network. Since the client processes each service as provided via the Internet, any network configuration can be used on the server side. The client terminals 106 to 109 can be, for example, a desktop computer, a notebook computer, a mobile computer and a PDA (personal digital assistant), and they may be mobile phones with a program execution environment. The client terminals 106 to 109 include an execution environment for programs such as web browsers (an internet browser, a WWW browser and a browser configured to use the World Wide Web).

Figure 2:
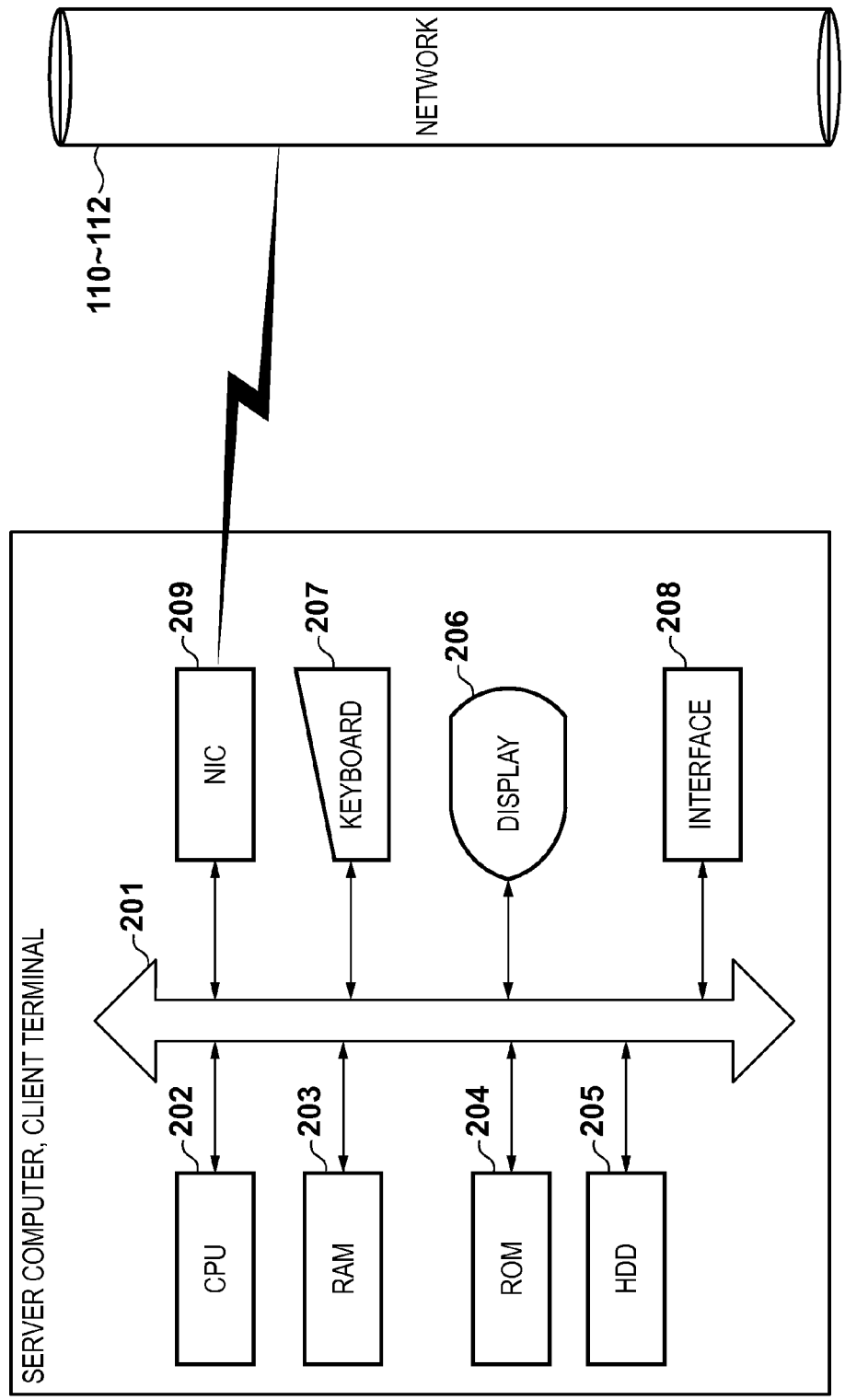
FIG. 2 is a hardware configuration diagram of a client terminal and a server computer according to the embodiment of the present invention.

<FIG. 2: Hardware Configuration of Client Terminal and Server Computer>

FIG. 2 is a hardware configuration diagram of the client terminals 106 to 109 and a server computer that executes a group of services 101 to 104 according to the present embodiment.

In FIG. 2, a CPU 202 performs overall control of the apparatus. The CPU 202 performs control so as to execute an application program and an OS stored in a hard disk drive (HDD) 205 and temporarily store information and a file and the like necessary to execute the program in a RAM 203. A ROM 204 is a storage unit in which various types of data such as the basic I/O program are stored. The RAM 203 is a temporary storage unit and functions as the main memory, a working area and the like for the CPU 202. The HDD 205 is an external storage unit, and functions as a high capacity memory in which application programs such as web browsers, programs for the group of services, an OS and related programs are stored. A display 206 is a display unit, and displays commands and the like input from a keyboard 207. An interface 208 is an external apparatus I/F, and allows connection of a printer, a USB device and a peripheral device. The keyboard 207 is an instruction input unit. A system bus 201 controls the flow of data in the apparatus. A network interface card (NIC) 209 exchanges data with an external apparatus via the interface 209 and the networks 110 to 112. The configuration of the computer is merely an example and thus is not limited to the example of the configuration shown in FIG. 2. For example, the storage for storing data and programs can be changed among the ROM 204, the RAM 203, the HDD 205 and the like depending on the features.

<FIG. 3: System Configuration of Client Terminal>

FIG. 3 is a system configuration diagram of the client terminals 106 to 109 according to the present embodiment. In FIG. 3, each client terminal uses a web browser 301 so as to perform processing such as transmitting requests to various web applications provided by the group of services 101 to 104 and displaying responses. Users of the cloud service use the web browsers 301 of the client terminals 106 to 109 to use the cloud service.

Subsequently, the authentication service 101, the business support service 102, the forms service 103 and the print service 104 that provide the cloud service will be described.

The authentication service 101 will be described first with reference to FIGS. 4, 5A and 5B. The authentication service 101 controls authentication and authorization of the entire cloud service.

<FIG. 4: System Configuration of Authentication Service 101>

FIG. 4 is a system configuration diagram of the authentication service 101 according to the present embodiment. In FIG. 4, an authentication application 401 is an application program (in other words, a web application) for providing an authentication function. A database 402 stores and manages user IDs, passwords, user-specific attribute information, authorization information and the like, and performs data management for implementing various functions with the authentication application 401.

A user management module 416 manages users who use the cloud service. User information of each user contains information such as a user ID, a password and a user name, as well as settings such as a tenant ID indicating to which tenant the user belongs and role information holding a role for the user, in association with the user. As used herein, "tenant" refers to the unit by which customers use/manage the cloud service. In the cloud service, a plurality of tenants are managed by a single system. If user companies are licensed as customers, each user company is managed in association with a tenant, and user data thereof is also managed by the tenant. The expression "managed by the tenant" refers to, in the case of a company as a customer, a situation in which individual users who belong to the company are managed by the unit of the company to which they belong. Of course, the customers are not limited to companies, and may be other organizations. In either case, the unit by which users are managed for each license agreement will be referred to as a "tenant". With the concept of "tenant", the user companies can use the cloud service with the same feel as if they are using their own services provided by different systems.

A role management module 415 manages access rights that allow users to access the cloud service with the concept of "role". In the present embodiment, for example, a role named "tenant administrator role" is defined, and URLs of web applications accessible by the role are set in association with the role. A user who has the tenant administrator role will be referred to as a "tenant administrator user". Conversely, a user who does not have the tenant administrator role will be referred to as a "general user".

An authorization module 413 implements the function of deciding whether to authorize a user who has requested a cloud service to access the service. The authorization module 413 receives a user ID and URL information of the web application for which the user has requested access. The authorization module 413 acquires a role assigned to the user ID from the user management module 416. The authorization module 413 also acquires URL information accessible by the role from the role management module 415. The authorization module 413 performs comparison, or in other words, matching between the URL for which the user has requested access and the URLs to which the user has been given access, and determines whether or not to permit access based on the result. How the authorization function works when the user actually has accessed the web application will be discussed in detail later when describing the forms service 103 and the print service 104.

A login module 411 is a web application for providing a login function that allows a user to log in to a cloud service. Upon receiving a request from the web browser 301 of any of the client terminals 106 to 109, the login module 411 executes login processing based on authentication information input into the web browser by the user.

In the login processing, the login module 411 notifies an authentication module 412 of the authentication information input by the user. The authentication module 412 carries out authentication processing in which it verifies the notified authentication information of the user against the user accounts and passwords registered in the database, and returns the result to the login module 411. The login module 411 generates a web screen for displaying the authentication result, and transmits a response to the web browser 301. How the login function works when the user has actually accessed the web application will be discussed in detail later when describing the forms service 103 and the print service 104.

An external I/F module 414 is an interface for processing execution requests sent from authentication agents 601 and 701, which will be described later, and execution requests sent from the business support service 102, and is provided in order to invoke the functions (the respective modules shown in FIG. 4) of the authentication service from the outside.

<FIGS. 5A and 5B: Examples of Data Managed by Authentication Service Database>

FIGS. 5A and 5B show examples of data managed by the database (authentication service database) 402 of the authentication service 101. In FIG. 5A, a user management table 501 manages various types of user information. User ID 511 indicates information for uniquely identifying users in the system, and can be IDs that are input during login. Password 512 is password information used when a user logs in to the system. Generally, passwords are, for example, hashed for security purposes before being stored, instead of directly storing password character strings. Tenant ID 513 indicates information for uniquely identifying tenants to which users belong. Surname 514 and Given Name 515 indicate information voluntarily input by users, with which user names are managed. Owned Role 516 lists role IDs assigned to each user.

An access right management table 502 shown in FIG. 5B manages which roles have which URL access rights. Role ID 531 indicates information for uniquely identifying roles in the system. Accessible URL 532 indicates URL information to which a user has been given access if the user owns the role. For example, a record 541 indicates that a user whose role ID is "distributor" can access "https://biz/tenantmanagement/*". Records stored in the authentication service database may be registered by, for example, a distributor user of the cloud service according to the content of the agreement with each tenant. Roles owned by users who have already been registered may be updated via a user management module shown in FIG. 7 by the administrator user of the tenant to which the users belong.

Figure 6:
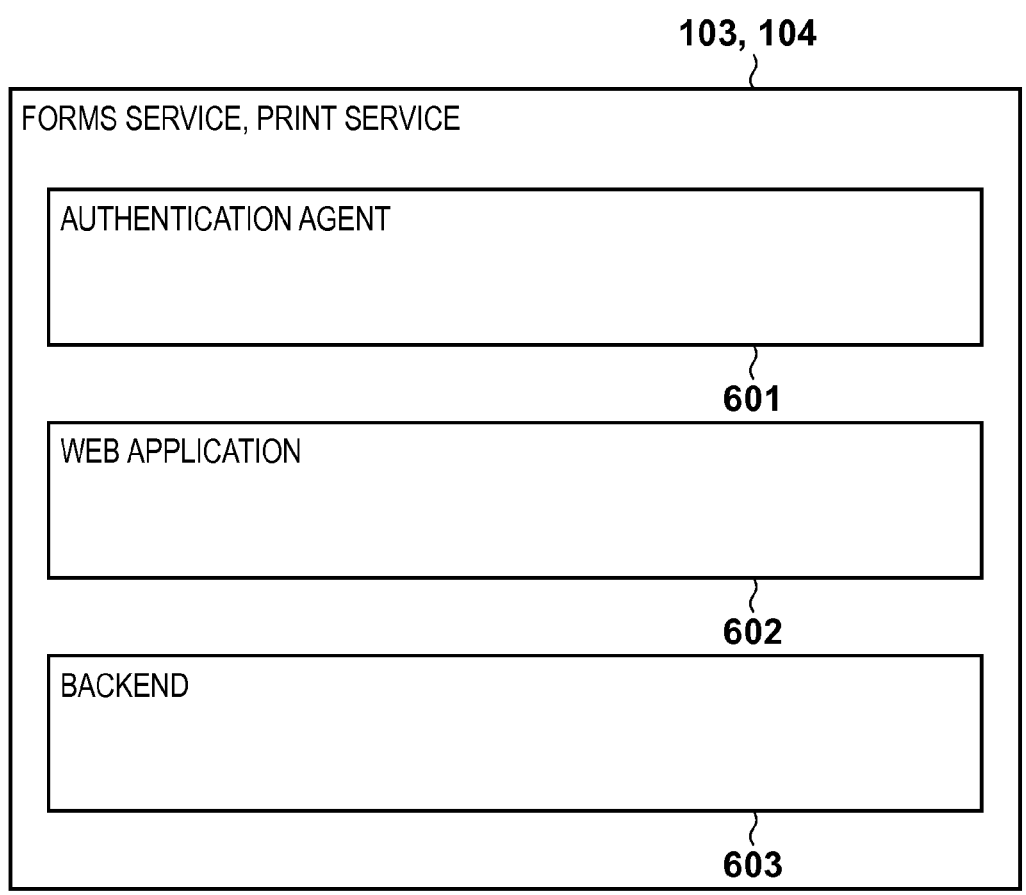
FIG. 6 is a system configuration diagram of a forms service and a print service according to the embodiment of the present invention.

<FIG. 6: Forms Service 103 and Print Service 104>

The overview of the forms service 103 and the print service 104 will be described with reference to a system configuration diagram shown in FIG. 6. The forms service 103 and the print service 104 are services that are actually sold to customers and provide a print function and a form generating function to customers.

In FIG. 6, a web application 602 receives a request from the web browser 301 of any of the client terminals 106 to 109. Upon receiving the request, the web application 602 requests a backend 603 to perform processing according to the content of the request. The backend 603 provides functions such as executing printing and generating forms so as to implement the service. The backend 603 executes the processing requested by the web application 602, and returns the result to the web application 602. The web application 602 generates a web screen based on the result of the processing performed by the backend 603, and transmits a response to the web browser 301. The authentication agent 601 interrupts the request from the web browser 301 to the web application 602, and carries out user authentication and authorization processing in cooperation with the authentication service 101. The authentication agent 601 transmits together with the request the information received from the client such as the authentication information containing a user ID, a password and so on to the external I/F 414 of the authentication service 101. The authentication service 101 performs authentication and authorization processing by using the functions of the authentication module 412 and the authorization module 413, and returns the results to the authentication agent 601. If the authentication and authorization processing has finished properly, or in other words, if the user has been authenticated, the authentication agent transmits a request to the web application 602. If the authentication and authorization processing has failed, or in other words, if the user is not authenticated, an error screen is displayed. The use of the forms service 103 and the print service 104 is controlled by the above-described processing.

Figure 7:
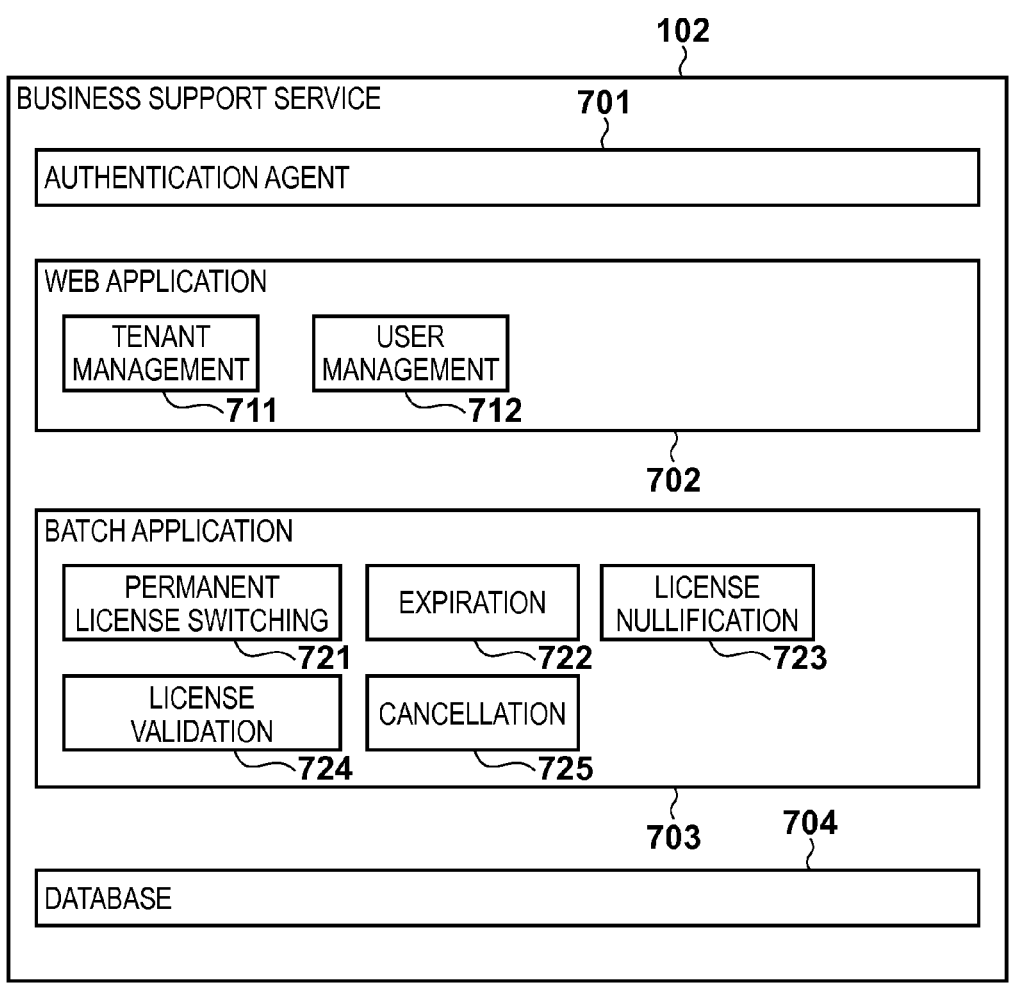
FIG. 7 is a system configuration diagram of a business support service according to the embodiment of the present invention.

<FIG. 7: Business Support Service 102>

Figure 8:
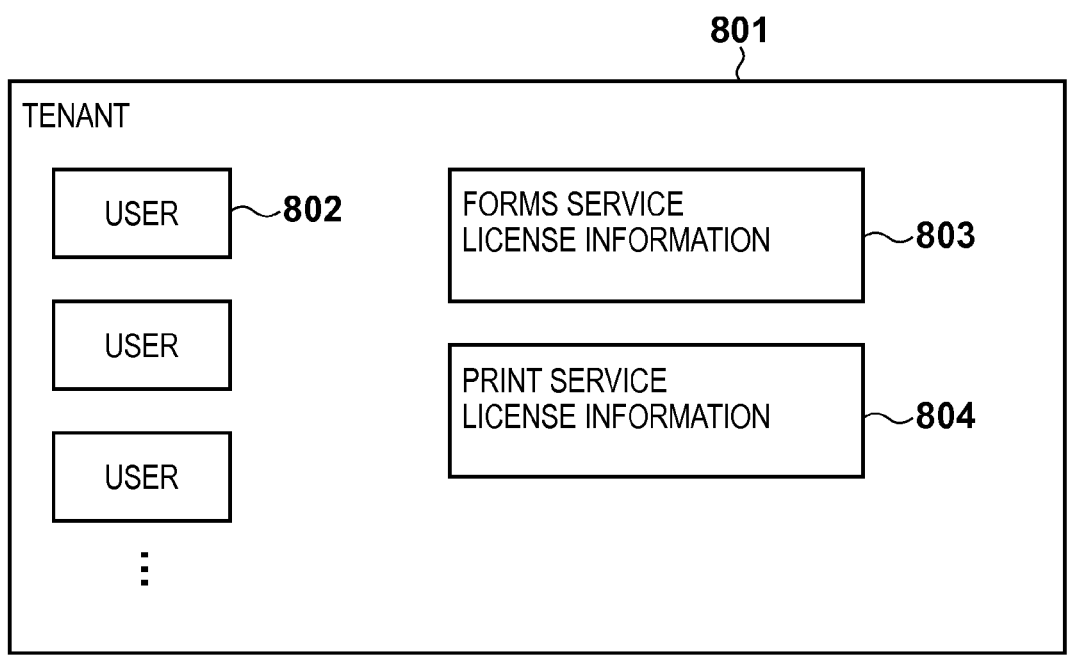
FIG. 8 is a schematic diagram showing a tenant structure according to the embodiment of the present invention.

Next, the business support service 102 will be described with reference to a system configuration shown in FIG. 7. The business support service 102 is a service that provides a business infrastructure such as license management and user management. In FIG. 7, a web application 702 receives a request from any of the web browsers 301 of the client terminals 106 to 109. The web application 702 that has received the request performs processing according to the content of the request, generates a web screen as a result of the processing, and transmits a response to the web browser 301. The web application 702 provides functions such as tenant management 711 and user management 712. The respective functions will be described later. A batch application 703 is a group of applications for implementing various functions that work on the backend, and implements functions such as permanent license switching 721, expiration 722, license nullification 723, license validation 724 and cancellation 725. These functions will be described later. A database 704 manages data that is used by the web application 702 and the batch application 703. In this example, tenant information shown in FIG. 8 is also managed by the database 704. As with the authentication agent 601, the authentication agent 701 controls access to the web application 702 of the business support service in cooperation with the authentication service 101.

<FIG. 8: Structure of Tenant Information>

FIG. 8 is a schematic diagram showing the structure of tenant information according to the present embodiment. In FIG. 8, management of cloud service usage by customers is performed by the unit of a tenant 801. Accordingly, there is a tenant 801 for each customer. Users 802 belong to the tenant 801, and each user is uniquely identified within the tenant 801. The tenant 801 stores a plurality of sets of license information. Since single license information is associated with a single service, in the present embodiment, the licenses for the forms service 103 are managed by forms service license information 803. The licenses for the print service 104 are managed by print service license information 804. All the license information contains information regarding the maximum number of users who are allowed to use the service, the type of license, the expiration date and so on. Tenant information is information in which, for example, user IDs of users who belong to a tenant and license information assigned to the tenant are associated with the tenant ID. Furthermore, the license information assigned to the tenant may be associated with the user IDs. Tenant information is generated by the distributor user of the cloud service upon signing a tenant agreement and registered in the database 704 of the business support service 102. In the present embodiment, after the tenant information has been registered, the tenant administrator user can make changes to settings regarding users who belong to the tenant and licenses assigned to the tenant via the tenant management module 711. In this way, the administrator user of a tenant performs management tasks, such as addition, deletion and change of licenses, users and user access rights, via the business support service. For this reason, at the point in time when tenant information is generated, an access right to the business support service is assigned to the administrator of the tenant (tenant administrator user). The access right to the business support service may be managed using license information as with other licenses, or may be permitted without license information. When tenant information has been updated and user access rights have been changed accordingly, the changes are reflected in the authentication service database. The reflection of changes in the authentication service database may be performed via a program (not shown) or authentication agent.

A procedure for starting the use of the cloud service will be described next. First, a description will be given of a procedure for generating a customer tenant, generating a user account for a tenant administrator and setting licenses for the tenant performed by a distributor user who sells the cloud service to customers, with reference to FIGS. 9 to 12.

The distributor user logs in to the cloud service and uses the tenant management module 711 of the business support service 102 to generate customer tenant information and a user account for a tenant administrator. The initially generated tenant information includes the tenant ID and a user ID for a tenant administrator of the tenant. Other users who belong to the tenant (general users) and licenses for services are registered in association with the tenant after the tenant information has been generated. Since tenant administrator users set licenses, a license that permits access to the business support service is assigned to the tenant administrator user of a tenant when tenant information thereof is generated. Alternatively, the tenant administrator user of a tenant may be permitted to access the business support service, without registration of license information.

<FIG. 9: License Setting Screen>

FIG. 9 is a diagram showing a screen on which the distributor user sets licenses for a tenant. The screen is generated by the tenant management module 711 based on, for example, the tenant information generated by the distributor user via a terminal. Then, in response to a request from the web browser 301 of the client terminal the distributor user is using, the screen is displayed on the client terminal that made the request. Reference numerals 901 and 902 respectively indicate the current license status of the forms service 103 and the print service 104 for the tenant. Service Name 911 shows the name of the service. License Status 912 shows the current license status. FIG. 9 shows an example of the initial status in which no licenses have been granted. The license status will be described later. Number of Licenses 913 shows the maximum number of users who can use the service. Number of Licenses in Use 914 shows the number of users in the tenant to which a role corresponding to the current license has been assigned. Schedule 915 shows the start date and expiration date of trial and/or permanent license. Reference numerals 903 and 904 are fields that are user interfaces for changing the license status. Making changes in License Status 912 and Number of Licenses 913 and making settings in Schedule 915 such as the expiration date of trial are possible. If changes are made to licenses via the user interfaces, the changes are reflected in the database 704.

Figure 10:
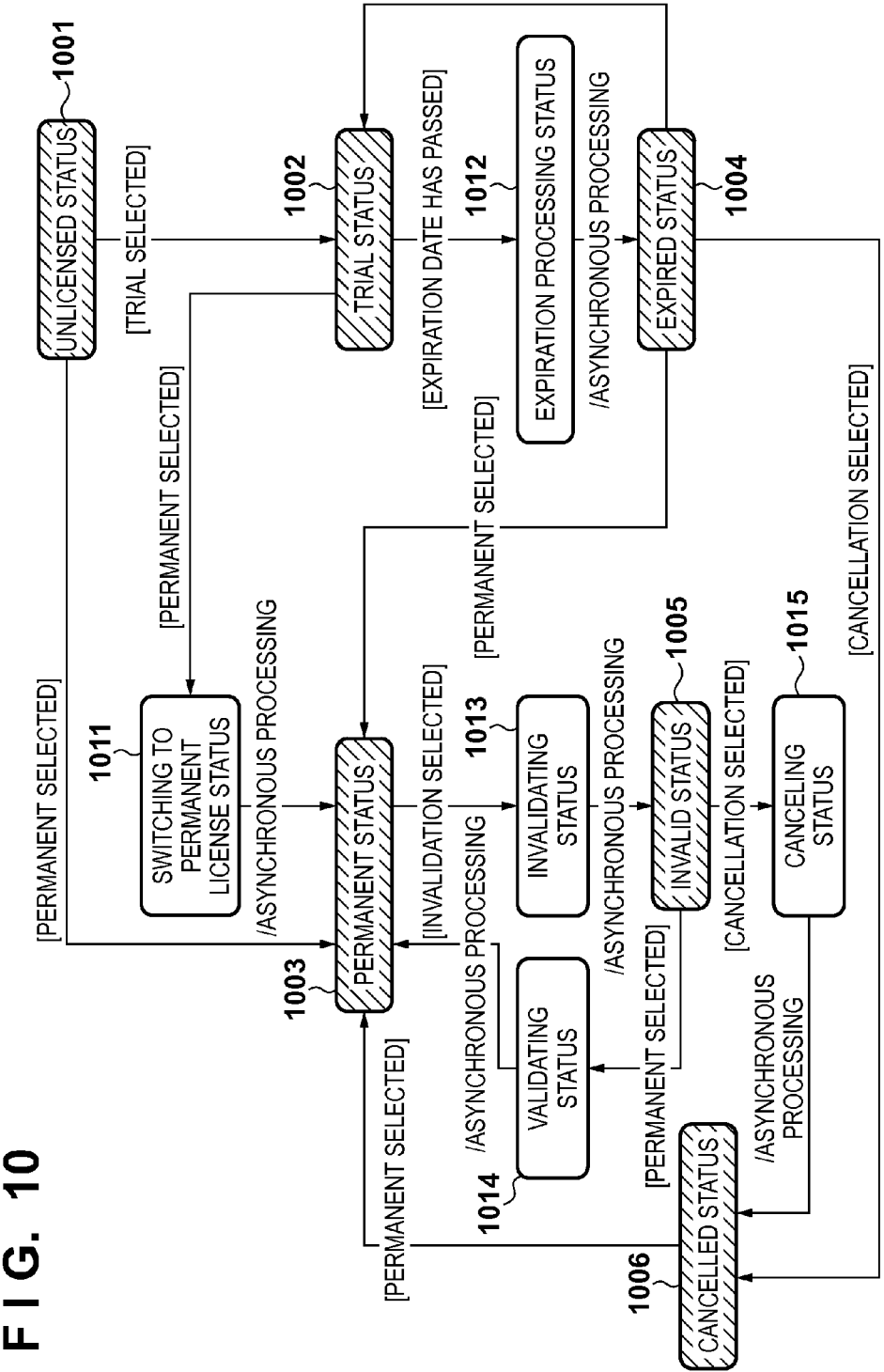
FIG. 10 is a license status transition diagram according to the embodiment of the present invention.

<FIG. 10: License Status>

FIG. 10 is a status transition diagram of license status. The license status will be described with reference to FIG. 10. The license status is information managed in association with each license information, and is updated each time the license status transitions. Unlicensed Status 1001 indicates a status in which the license is not granted. If, for example, new license information is generated for a new tenant, Unlicensed Status 1001 is set as the initial status of the license. In Unlicensed Status 1001, the service corresponding to the license cannot be used. However, in Unlicensed Status 1001, the distributor user can change the license status to Trial Status 1002 or Permanent Status 1003 on the screen shown in FIG. 9. When the license status is changed to Trial Status 1002, it is necessary to make settings in Number of Licenses 913 and Schedule 915 such as the trial expiration date. When the license status is changed to Permanent Status 1003, it is necessary to make settings in Number of Licenses 913.

Trial Status 1002 indicates a status in which a product license is used on a trial basis. In the case where a service is used on a trial basis, there may be a set trial period and limited functions available. For example, in the case of the forms service, users to which the trial role has been assigned cannot save forms in the server. In the case of the print service, they cannot perform reprinting. Other restrictions include use of the forms service for only 30 days.

Permanent Status 1003 indicates a status in which the product license has been legally purchased and is used. When switching from Trial Status 1002 to Permanent Status 1003, the status is switched via Switching to Permanent License Status 1011. Such license switching is instructed by the distributor user on the screen shown in FIG. 9 during Trial Status 1002. When an instruction to change the license status to Permanent Status 1003 is issued by the distributor user, the license status changes to Switching to Permanent License Status 1011. A detailed description of processing for switching from Trial Status 1002 to Permanent Status 1003 will be given later.

Expired Status 1004 indicates a status in which the effective period of Trial Status 1002 has expired, or in other words, the trial expiration date has elapsed, and thus the customer cannot use the service. When switching from Trial Status 1002 to Expired Status 1004, the status is switched via Expiration Processing Status 1012. Such license status switching is carried out by processing of the expiration function 722 of the batch application 703. A detailed description of processing for switching from Trial Status 1002 to Expired Status 1004 will be given later.

Invalid Status 1005 indicates a status in which Permanent Status 1003 is forcibly interrupted. When switching from Permanent Status 1003 to Invalid Status 1005, the status is switched via Invalidating Status 1013. Such license switching is instructed by the distributor user on the screen shown in FIG. 9 during Permanent Status 1003. When an instruction to change the license status to Invalid Status 1005 is issued by the distributor user, the license status changes to Invalidating Status 1013. A detailed description of processing for switching from Permanent Status 1003 to Invalid Status 1005 will be given later. Also, when switching from Invalid Status 1005 to Permanent Status 1003, the status changes via Validating Status 1014. Such license switching is carried out on the screen shown in FIG. 9 by the distributor user during Invalid Status 1005. When an instruction to change the license status to Permanent Status 1003 is issued by the distributor user, the license status changes to Validating Status 1014. A detailed description of processing for switching from Invalid Status 1005 to Permanent Status 1003 will be given later.

Cancelled Status 1006 indicates a status in which the agreement has expired and the license has been cancelled, and thus the customer cannot use the service. When switching from Invalid Status 1005 to Cancelled Status 1006, the status is switched via Canceling Status 1015. Such license status switching is carried out on the screen shown in FIG. 9 by the distributor user during Invalid Status 1005. When an instruction to change the license status to Cancelled Status 1006 is issued by the distributor user, the license status changes to Canceling Status 1015. A detailed description of processing for switching from Invalid Status 1005 to Cancelled Status 1006 will be given later. When switching from Expired Status 1004 to Cancelled Status 1006, the status changes directly to Cancelled Status 1006. Such license switching is carried out on the screen shown in FIG. 9 by the distributor user during Expired Status 1004. When an instruction to change the license status to Cancelled Status 1006 is issued by the distributor user, the license status switches to Cancelled Status 1006.

When switching from Cancelled Status 1006 to Permanent Status 1003, the status changes directly to Permanent Status 1003. Such license switching is carried out on the screen shown in FIG. 9 by the distributor user during Cancelled Status 1006. When an instruction to change the license status to Permanent Status 1003 is issued by the distributor user, the license status switches to Permanent Status 1003.

The changed license status is reflected in the license information registered in the database 704.

As described thus far, when the distributor user operates the screen shown in FIG. 9, the screen is switched according to the license status at the time of operation. Also, rather than directly changing to the target license status, the license status is set to any of the processing statuses 1011 to 1015 to prepare for asynchronous license information change processing depending on the license status being changed. The reason that the asynchronous license information change processing is carried out is because it is necessary to update access right information assigned to users according to the change of the license status. Updating access right information requires sequential processing on all of the users in the tenant, and thus it takes a very long time.

<FIGS. 11A and 11B: Examples of Data Managed by Database 704>

FIGS. 11A and 11B show examples of data that show the association of tenant license information, product license status and roles and is managed by the database 704 of the business support service 102. A license management table 1101 shown in FIG. 11A is a table for managing services, tenants and the like on a license-by-license basis. Licenses are uniquely identified in the system by a license ID 1111. Product ID 1112 shows an ID for uniquely identifying a product, and in this example, an ID for a service. In FIG. 11A, in Product ID 1112, "form" is defined to indicate the forms service 103, and "print" is defined to indicate the print service 104. Tenant ID 1113 indicates information for specifying to which tenant the license belongs. License Status 1114 shows the status of license. Any of the values of the license statuses 1001 (Unlicensed Status) to 1011 (Switching to Permanent License Status) described with reference to FIG. 10 is recorded. Number of licenses 1115 indicates the maximum number of licenses, and the same values as those shown in Number of Licenses 913 are set. In Start Date 1116, the date or the date and time when the license is brought into use is recorded. In Expiration Date 1117, the trial expiration date input when a trial license is set, or the date and time when cancellation occurred is recorded.

In FIG. 11B, a product role management table 1102 is a table that defines roles on a service-by-service basis. Role ID 1131 indicates information for uniquely identifying roles, and the same role IDs 531 defined in the access right management table 502 of the authentication service 101 are set. Product ID 1133 indicates information indicating which service the role is for. A record 1141 in this example defines that "formAdmin" role is for "form" product license. License Type 1134 shows whether the role is for "Permanent" or "Trial" license. Records 1141 and 1142 in this example respectively define that "formAdmin" role is for "Permanent" license and "formTrialAdmin" role is for "Trial" license. In Related Role ID 1132, a role ID that is related to the role ID is defined. In the case where "Permanent" is set in License Type 1134, in Related Role ID 1132, a role ID whose license type is "Invalid" is set. In the case where "Trial" is set in License Type 1134, a role ID whose license type is "Permanent" is set. In the record 1141 of this example, "formInvldAdmin", which is a role whose license type is "Invalid", is set as the role related to the "formAdmin" role for permanent license. In the record 1142, "formAdmin", which is a role whose license type is permanent, is set as the role related to the "formTrialAdmin" role for trial license. In Consumption 1135, whether or not to manage the number of licenses is defined. If "0" is set in Consumption 1135, the number of licenses is not managed, and thus the tenant administrator user can assign an unlimited number of roles to general users. If "1" is set in Consumption 1135, the number of licenses is managed, and thus the tenant administrator user can assign only the maximum number of roles defined in Number of licenses 1115. In this example, for the "formAdmin" role of the record 1141, the number of licenses is not managed, but for "formUser" role of a record 1143, the number of licenses is managed.

Figure 12:
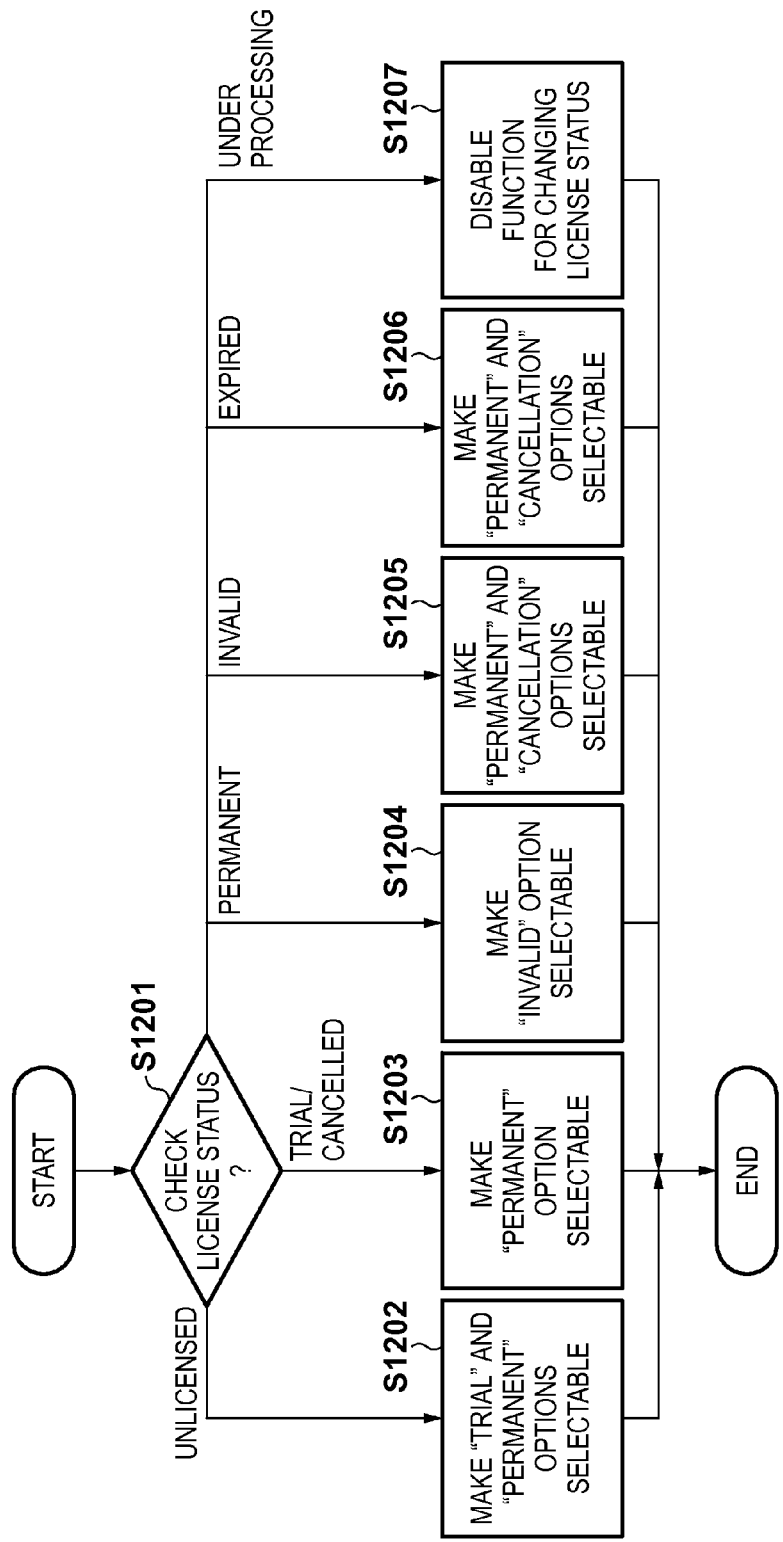
FIG. 12 is a processing flowchart for generating the screen shown in FIG. 9 performed by the business support service according to the embodiment of the present invention.

<FIG. 12: License Setting Screen Generation Processing by Tenant Management Module>

FIG. 12 is a processing flowchart for generating the screen shown in FIG. 9 performed by the tenant management module 711. When the distributor user accesses the screen shown in FIG. 9 of the tenant management module 711 via the web browser 301, the tenant management module 711 generates the screen shown in FIG. 9 according to a procedure shown in FIG. 12, and transmits the screen to the web browser 301 of the client via the Web. To access the screen shown in FIG. 9, for example, upon access to the business support service 102, a service selection screen is displayed. Upon selecting a license setting for an existing tenant in the screen, the tenant management module 711 is executed and the processing of FIG. 12 is started. In FIG. 12, first, the license status of the selected tenant is checked in step S1201. In this processing, the information in License Status 1114 of all of the licenses set for the tenant ID of the selected tenant is read from the license management table 1101. If there is a plurality of licenses, the information is sequentially read by focusing on each license. If "unlicensed" is set for the focused license in License Status 1114, the procedure advances to step S1202. In step S1202, options are made selectable such that either "Trial" or "Permanent" can be set in the fields 903 and 904 in License Status 912. If "Trial" or "Cancelled" is set for the focused license in License Status 1114, the procedure advances to step S1203. In step S1203, an option is made selectable such that "Permanent" can be set in the fields 903 and 904 in License Status 912. If "Permanent" is set for the focused license in License Status 1114, the procedure advances to step S1204. In step S1204, an option is made selectable such that "Invalid" can be set in the fields 903 and 904 in License Status 912. If "Invalid" is set for the focused license in License Status 1114, the procedure advances to step S1205. In step S1205, options are made selectable such that either "Permanent" or "Cancelled" can be set in the fields 903 and 904 in License Status 912. If "Expired" is set for the focused license in License Status 1114, the procedure advances to step S1206. In step S1206, options are made selectable such that either "Permanent" or "Cancelled" can be set in the fields 903 and 904 in License Status 912. If other processing status is set for the focused license in License Status 1114, the procedure advances to step S1207. In step S1207, all of the functions for changing the license status are made disabled such that the license status cannot be changed. This prevents, when the license is in an under processing status, the license status from being changed. The above-described processing is performed on all of the licenses assigned to the selected tenant.

The generated screen of FIG. 9 is displayed on the terminal used by the distributor user via the web server and the web browser. In the screen of FIG. 9, the distributor user inputs setting values necessary for each license of the selected tenant. The input setting values are transmitted to the tenant management module 711 of the business support service 102 via the Web, and reflected in the database 704.

Up to here, the procedure by which the distributor user generates customer tenant information, generates a user account for a tenant administrator, and sets licenses for a tenant was described with reference to FIGS. 9 to 12. Subsequently, a flowchart by which the tenant administrator user assigns a product license to a user will be described with reference to FIGS. 13 through FIGS. 15A to 15D.

The tenant administrator user logs in to the cloud service, and generates an account for a general user in the tenant to which the tenant administrator user belongs by using the user management module 712 of the business support service 102. When the tenant administrator user has assigned product roles to a general user, the general user can use the corresponding products.

<FIG. 13: Role Assignment/Removal for General User by Tenant Administrator User>

FIG. 13 is a diagram showing a screen used when the tenant administrator user assigns and removes product roles to a general user. This screen is generated by the user management module 712 in response to a request to generate a user role management screen from the tenant administrator user via the Web, and displayed on the web browser 301 of one of the client terminals 106 to 109 used by the tenant administrator user. This diagram shows an example of a screen displayed based on the example data shown in FIGS. 5A and 5B and FIGS. 11A and 11B.

User ID 1301 shows the user ID of a general user for which operation is currently performed. In this example, operation is currently performed for "customer1@1002AA" 523. In this ID, "1002AA" is a tenant ID and "customer1" is a user ID of a user who belongs to the tenant. The general user for which operation is currently performed is determined by, for example, prior to the screen shown in FIG. 13, generating a screen listing user IDs of users belonging to the tenant by the user management module 712, displaying the generated screen on the web browser of the client and selecting a user from among the list.

A screen 1302 is a setting screen for the forms service, and a screen 1303 is a setting screen for the print service. In this example, operation is performed for the tenant "1002AA", and it can be seen from the records 1121 and 1122 of the license management table 1101 that this tenant has a "Permanent" license for the forms service and a "Trial" license for the print service. Accordingly, a role assigning function is displayed as effective for the licenses.

In Role 1311, all service roles related to the licenses associated with the selected tenant are displayed. In this example, all roles related to the current license status of the forms service are displayed. In this example, from the information of the record 1121 of the license management table 1101, it can be seen that the license status of the product ID "form" of the tenant "1002AA" is "Permanent". Accordingly, based on the information of records 1141 and 1143 whose product ID is "form" and license type is "Permanent" in the product role management table 1102 of FIG. 11B, the corresponding display names 1136 are used and displayed. In Status 1313, whether or not a role corresponding to the license is currently assigned to the user is displayed by using, for example, "Unused" 1321 or "In Use" 1322. According to the user management table 501 of FIG. 5A, in Owned Role 516, "formUser" role is assigned to the user "customer1@1002AA" 523. Accordingly, "General" is displayed as the name of the "formUser" role, and "In Use" 1322 is displayed as the status.

A start button 1323 is pressed to assign an unused license. Upon pressing the button, the corresponding role "formAdmin" is assigned to the user "customer1@1002AA" 523. A termination button 1324 is pressed to remove assignment of the license in use. Upon pressing the button, the assignment of the corresponding role "formUser" is removed from the user "customer1@1002AA" 523.

In Number of Used Licenses/Number of Available Licenses 1314, a value 1325 indicating the number of used licenses and a value 1326 indicating the number of available licenses are displayed. The value 1325 indicating the number of used licenses is displayed by sending, to the external I/F 414 of the authentication service 101, an inquiry about the number of users who belong to the tenant ID "1002AA" and to which "formUser" role has been assigned. The authentication service 101 returns the number of users who belong to the tenant and to which the "formUser" role has been assigned by referencing the user management table 501. The value 1326 indicating the number of available licenses is displayed by acquiring from Number of licenses 1115 of the license management table 1101.

When the tenant administrator user has assigned or removed a role for the user on the user interface displayed through the above processing, the user ID and the role ID of the assigned or removed role are saved in the form of a file and transmitted to the business support service 102. Upon receiving the file, the user management module 712 of the business support service 102 requests the authentication service 101 to reflect the updated user role in the user management table 501.

Figure 14A:
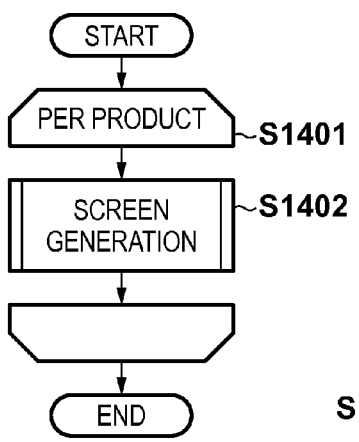
FIGS. 14A, 14B and 14C show processing flowcharts for generating the screen shown in FIG. 13 performed by the business support service according to the embodiment of the present invention.
Figure 14B:
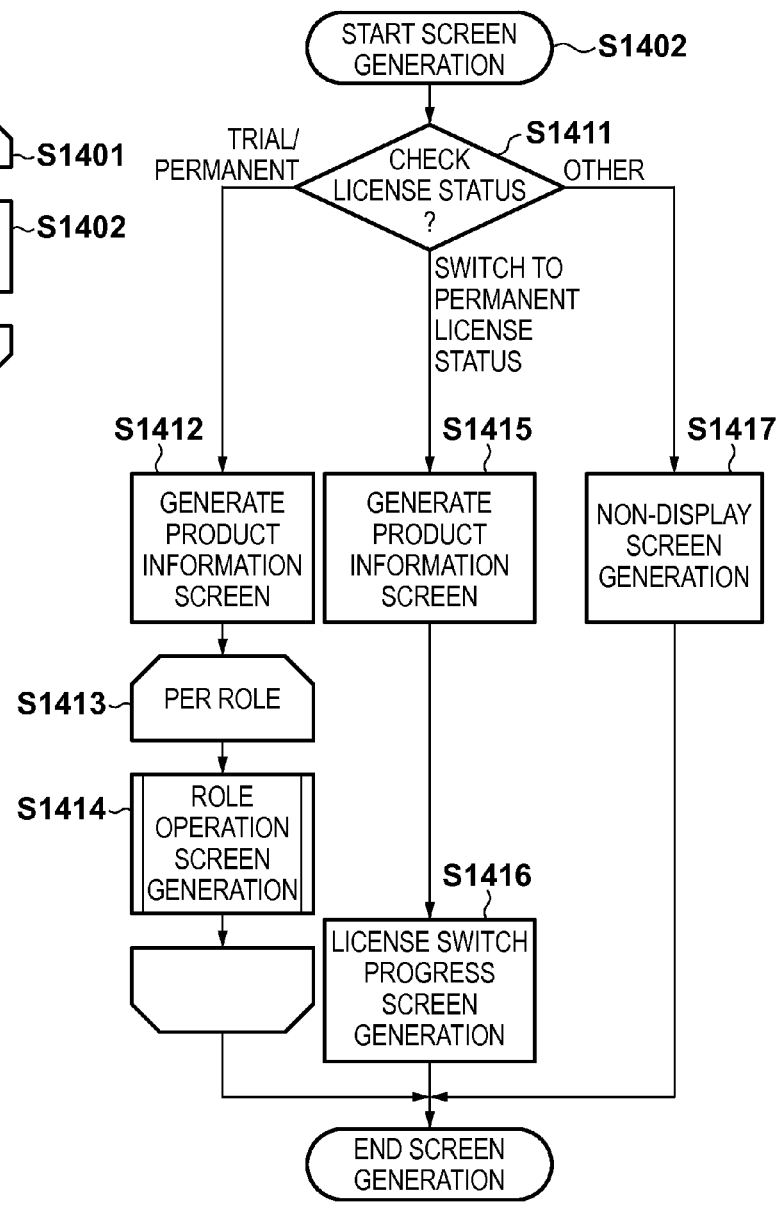
Figure 14C:
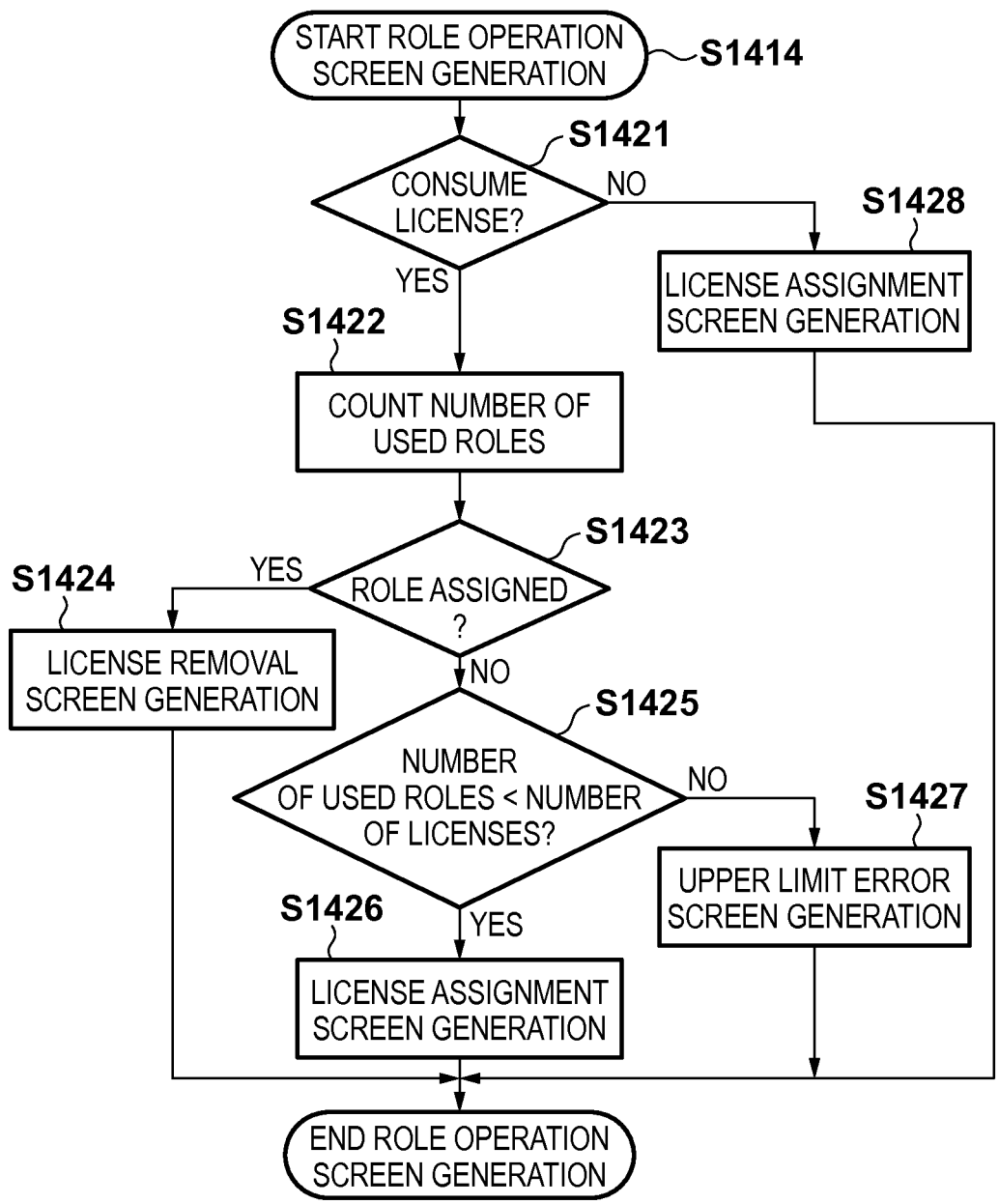

<FIGS. 14A to 14C: Procedure for Generating Role Management Screen>

FIGS. 14A to 14C show a processing flowchart for generating the screen shown in FIG. 13 performed by the user management module 712. When the distributor user accesses the screen shown in FIG. 13 of the user management module 712 via the web browser 301, the user management module 712 generates the screen shown in FIG. 13 according to the procedure shown in FIGS. 14A to 14C and transmits the screen to the web browser 301 of the client via the Web. To access the screen shown in FIG. 13, for example, upon access to the business support service 102, a service selection screen is displayed. Upon selecting a role setting for an existing user in the screen, the user management module 712 is executed and the processing of FIGS. 14A to 14C is started. In FIGS. 14A to 14C, first, in step S1401, processing is performed for each product in the tenant. In the license management table 1101 of this example, there are two licenses for the tenant ID "1002AA", namely, the license 1121 for the product ID "form" and the license 1122 for the product ID "print", and therefore loop processing is executed for the two products.

In screen generation processing S1411 of screen generation processing S1402, first, the license status is checked. The license status is checked by reading the information of License Status 1114 of the license management table 1101.

In step S1411, if the license status is "Trial" or "Permanent", then in step S1412, a product information screen is generated. In step S1412 of generating a product information screen, service display fields 1302 and 1303 and a title row including 1311 to 1314 are generated. In step S1413, loop processing is performed for each role. Processing is performed on all roles defined in Role ID 1131 based on Product ID 1133, License Status 1114 and License Type 1134. For example, in the case where the product ID is "form" and the license type is "Permanent", processing is performed on the "formAdmin" role 1141 and the "formUser" role 1143 of the product role management table 1102.

In step S1414, role operation screen generation is performed. In step S1421, it is checked whether or not the role consumes the license. This processing is performed by referencing the value set in Consumption 1135 of the product role management table 1102. If it is determined that the role consumes the license, the procedure advances to step S1422. If not, the procedure advances to step S1428 of generating a license assignment screen. For example, the "formAdmin" role 1141 does not consume the license, and the "formUser" role 1143 consumes the license. The license assignment screen generated in step S1428 corresponds to the display field 304 of FIG. 13. Since it is possible to assign the "formAdminUser" role to the user "customer1@1002AA", the role assignment button 1323 is displayed in this field.

In step S1422, the number of used roles is counted. In this processing, an inquiry about the role ID and tenant ID of the role currently processed is sent to the external I/F 414 of the authentication service 101. In step S1423, it is checked whether the role has been assigned to the user 1301. If it is determined that the role has been assigned to the user, the procedure advances to step S1424 of generating a license removal screen. The license removal screen generated in step S1424 corresponds to the display field 305 of FIG. 13. Since the "formUser" role has been assigned to the user "customer1@1002AA" the role removal button 1324 is displayed.

If it is determined in step S1423 that no role has been assigned, the procedure advances to step S1425. In step S1425, it is checked whether the number of used roles is smaller than the number of licenses. In this processing, a comparison is made between the value acquired in step S1422 and the value in Number of licenses 1115 of the license management table 1101. If the number of used roles is smaller, the procedure advances to step S1426 of generating a license assignment screen. Otherwise, the procedure advances to step S1427 of generating an upper limit error screen. The license assignment screen generated in step S1426 corresponds to a screen 1501 of FIG. 15A. A role assignment button 1502 is enabled. The upper limit error screen generated in step S1427 corresponds to 1511 of FIG. 15B. A message 1512 is displayed in order to notify the user that the maximum number of licenses has been reached so that no more roles can be assigned. A role assignment button 1513 is made invalid because no more roles can be assigned.

Reverting to the processing of step S1411, if in step S1411, the license status is "Switching to Permanent License Status", the processing from step S1415 is performed. In the case of "Switching to Permanent License Status", the roles assigned to each user are updated by the batch application 703. Accordingly, roles for permanent license and trial license are assigned in a mixed manner to the user of the tenant. In this status, the accurate number of currently assigned roles cannot be acquired, so it is difficult to manage the maximum number. It is therefore necessary to restrict the user operation until the batch processing ends. Accordingly, in step S1415, a product information screen is generated. This processing is the same as that of step S1412. Furthermore, in step S1416, a license switch progress screen is generated. The license switch progress screen generated in step S1416 corresponds to FIG. 15C. A message 1521 is displayed in order to notify that license switch processing is currently performed, and role assignment buttons 1522 and 1523 are made invalid in order to restrict the user operation.

Reverting to the processing of step S1411, in step S1411, if the license status is "Other", in step S1417, a non-display screen is generated. The non-display screen generated in step S1417 corresponds to FIG. 15D. In this example, because the license status of the forms management service is "Other", the indication 1302 of forms management service shown in FIG. 13 is not displayed, and only the indication 1303 of print service is displayed. Such a non-display screen is displayed, for example, not only in the case of "Invalid" and "Cancelled" where there is no need to present assignable roles to the user, but also in the case of "Expiration Processing Status" and "Invalidating Status" where the role has not yet been updated, in order to notify the customer administrator user of the fact that the service is no longer available.

The flowchart for assigning licenses to a general user performed by the customer administrator user has been described above.

Finally, the processing of the batch application 703 of the business support service 102 will be described. The batch application 703 runs asynchronously to the web application 711, and is regularly executed to check whether or not processing is necessary and execute processing.

Figure 16A:
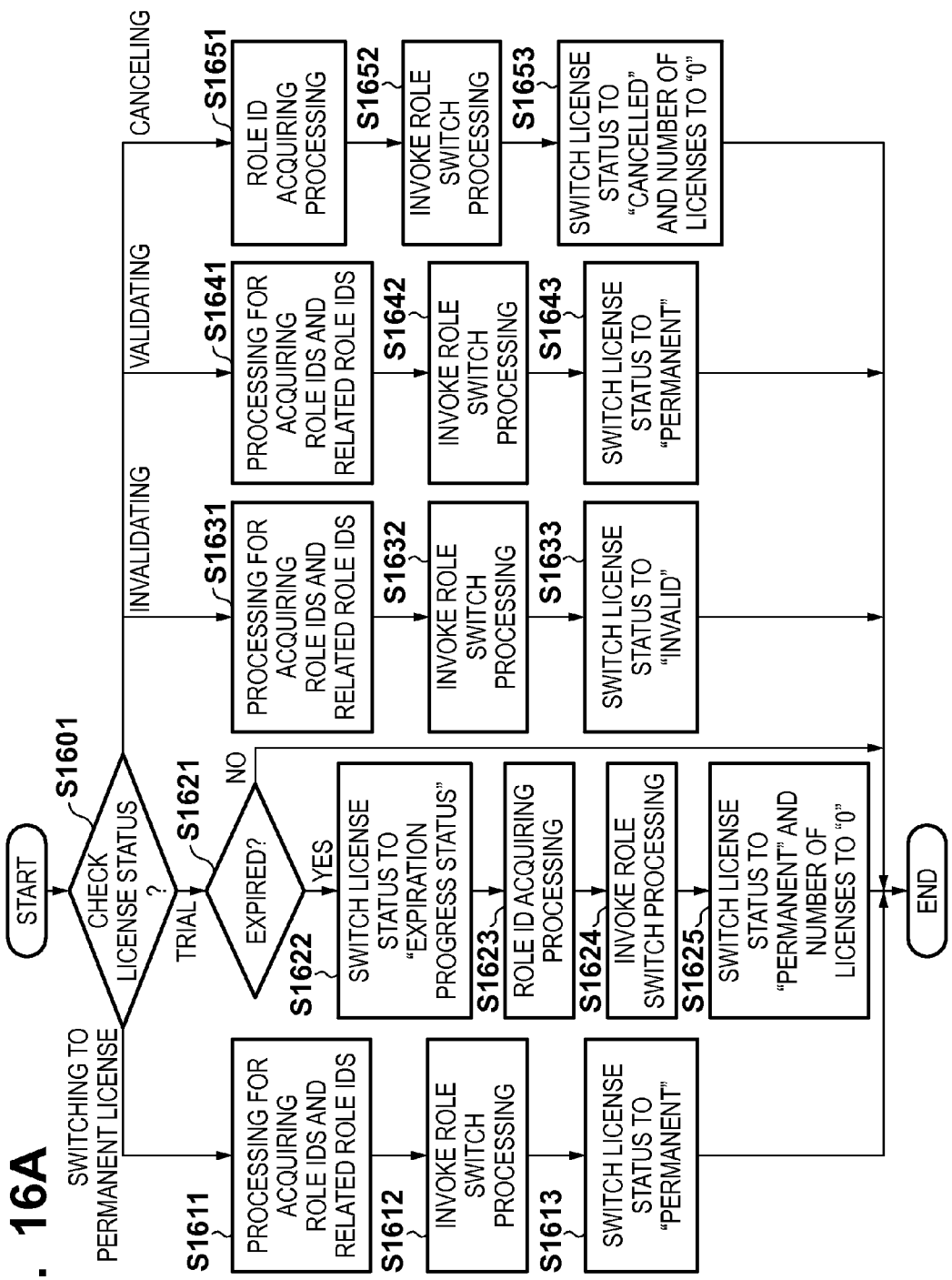
FIGS. 16A and 16B show processing flowcharts of batch processing performed by the business support service according to the embodiment of the present invention.
Figure 16B:
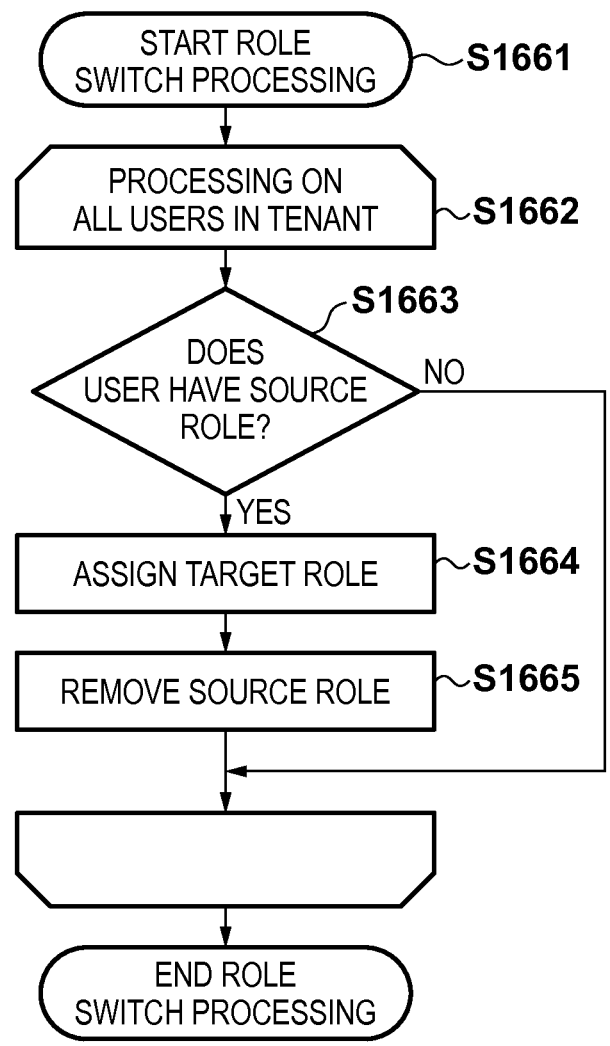

<FIGS. 16A and 16B: Role Switch Processing Performed Along with License Switching>

FIG. 16A is a diagram showing a processing flowchart performed by the batch application 703. In step S1601, the license status is checked. Commencement of execution of this processing is determined by the batch application 703 of the business support service 102 based on the information of License Status 1114 of the license management table 1101. Accordingly, for example, the batch application 703 sequentially focuses on each license at a regular time interval and checks the license status.

If the license status of the focused license is "Transition to Permanent License", processing is carried out by the permanent license switching function 721. In step S1611, processing for acquiring role IDs and related role IDs is carried out. In this processing, role IDs and related role IDs of roles whose license type is "Trial" are acquired by the product role management table 1102 based on the product ID of the currently processed license. For example, if the product ID is "form", the role ID "formTrialAdmin" and the related role ID "formAdmin" of the record 1142, and the role ID "formTrialUser" and the related role ID "formUser" of the record 1144 are acquired. Next, in step S1612, a request for role switch processing is sent to the external I/F 414 of the authentication service 101. Furthermore, the tenant ID, the role IDs as source roles and the related role IDs as target roles are sent to the authentication service 101 together with the request for role switch processing. The authentication service 101 operates the user management table 501 to perform processing in which the target roles are assigned to the users of the tenant to which the source role IDs have been assigned and the source roles are removed. The roles of the tenant are thereby switched from the roles corresponding to "Trial" to the roles corresponding to "Permanent". After completion of the switch processing in step S1612, in step S1613, the license status is changed to "Permanent".

Step S1661 of FIG. 16B shows a flowchart of role switch processing performed by the authentication service 101 in response to a request for role switch processing. In step S1662, loop processing is performed by sequentially focusing on each user in the tenant. In step S1663, it is checked whether the focused user has a source role. If the user has a source role, the procedure advances to step S1664, where the designated target role is assigned, or if no target role has been designated, the processing is skipped. After the processing of step S1663, in step S1665, the source role is removed. If, for example, it is assumed that the role ID "formTrialUser" is the source role ID and the related role ID "formUser" is the target role ID, and these role IDs are sent to the authentication service 101. In this case, in the authentication service 101, processing is performed on the users to which the source role ID "formTrialUser has been assigned, selected from among all the users of the designated tenant. In step S1664, the target role ID "formUser" is assigned. At this time, the user has two role IDs, namely, "formUser" and "formTrialUser". Accordingly, the user can use the service with the use of the authority of "formUser". Thereafter, in step S1665, "formTrialUser" is removed, whereby the role switching ends. Assignment and removal of roles are implemented by adding or removing role IDs in Owned Role 516 of the user management table 501.

Reverting to step S1601, if in step S1601, the license status is "Trial", processing is performed by the expiration function 722. In step S1621, it is checked whether the license expiration date 1117 has passed. If the expiration date has passed, in step S1622, the license status is changed to "Expiration Processing Status". In step S1623, role ID acquiring processing is carried out. In this processing, role IDs whose license type is "Trial" are acquired by the product role management table 1102 based on the product ID of the currently processed license. For example, if the product ID is "form", the role ID "formTrialAdmin" of the record 1142 and the role ID "formTrialUser" of the record 1144 are acquired. Next, in step S1624, a request for role switch processing is sent to the external I/F 414 of the authentication service 101. Furthermore, the tenant ID, the role IDs as source roles and unspecified target roles are sent to the authentication service 101 together with the request for role switch processing, and thereby all of the roles corresponding to "Trial" in the tenant are removed. After completion of the role switch processing in step S1624, in step S1625, the license status is changed to "Expired", and the number of licenses is changed to "0".

Reverting to step S1601, if in step S1601, the license status is "Under Invalidation Processing", processing is performed by the license invalid function 723. In step S1631, processing for acquiring role IDs and related role IDs is carried out. In this processing, role IDs and related role IDs of roles whose license type is "Permanent" are acquired by the product role management table 1102 based on the product ID of the currently processed license. For example, if the product ID is "form", the role ID "formAdmin" and the related role ID "formInvldAdmin" of the record 1141, and the role ID "formUser" and the related role ID "formInvldUser" of the record 1143 are acquired. Next, in step S1632, a request for role switch processing is sent to the external I/F 414 of the authentication service 101. By sending the tenant ID, the role IDs as source roles and related role IDs as target roles to the authentication service, all of the roles corresponding to "Permanent" in the tenant are switched to roles corresponding to "Invalid". Since the roles corresponding to "Invalid" are not permitted to access any URLs, they become inaccessible to the service as a result of this processing. After completion of the role switch processing in step S1632, in step S1633, the license status is changed to "Invalid".

Reverting to step S1601, if in step S1601, the license status is "Under Validation Processing", processing is performed by the license validation function 724. In step S1641, processing for acquiring role IDs and related role IDs is carried out. In this processing, role IDs and related role IDs of roles whose license type is "Permanent" are acquired by the product role management table 1102 based on the product ID of the currently processed license. For example, if the product ID is "form", the role ID "formAdmin" and the related role ID "formInvldAdmin" of the record 1141, and the role ID "formUser" and the related role ID "formInvldUser" of the record 1143 are acquired. Next, in step S1642, a request for role switch processing is sent to the external I/F 414 of the authentication service 101. By sending the tenant ID, the related role IDs as source roles and the role IDs as target roles to the authentication service, all of the roles corresponding to "Invalid" in the tenant are switched to roles corresponding to "Permanent". After completion of the role switch processing in step S1642, in step S1643, the license status is changed to "Permanent".

Reverting to step S1601, if in step S1601, the license status is "Under Cancellation Processing", processing is performed by the cancellation function 725. In step S1651, role ID acquiring processing is carried out. In this processing, related role IDs of roles whose license type is "Permanent" are acquired by the product role management table 1102 based on the product ID of the currently processed license. For example, if the product ID is "form", the related role ID "formInvldAdmin" of the record 1141 and the related role ID "formInvldUser" of the record 1143 are acquired. Next, in step S1652, a request for role switch processing is sent to the external I/F 414 of the authentication service 101. Furthermore, the tenant ID, the related role IDs as source roles and unspecified target roles are sent to the authentication service, and thereby all of the roles corresponding to "Invalid" in the tenant are removed. After completion of the role switch processing in step S1652, in step S1653, the license status is changed to "Cancelled", and the number of licenses is changed to "0".

The processing of the batch application 703 has been described in detail. With this processing, the change-of-access right processing for general users performed along with a change of the license status is implemented asynchronously. This is the end of description of a best mode for carrying out the present invention.

According to the embodiment described above, the roles in which user's access rights to services are defined can be managed by a licensed tenant administrator. In the embodiment, two roles, namely, a role for administrator and a role for general user are used for a license, but it is also possible to prepare roles of more finely defined access rights and assign the roles to users. In this case, it is sufficient if the distributor user on the cloud service side defines tenants based on agreements (for example, users for each tenant, the content of licenses, etc.), and assignment of rights to users in a tenant can be performed on the tenant side.

Furthermore, in the case of license switching, switching of roles for each user that comes therewith is executed asynchronously to the license switching. It is therefore possible to prevent an increase in processing loads and a processing delay that are caused by role switching. During the time period from license switching to role switching, roles before license switching and roles after switching coexist, but any changes to roles such as assigning a role and removing a role are prohibited, and it is therefore possible to prevent a contradiction caused by the difference in timing between license switching and role switching.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-129546, filed Jun. 9, 2011, which is hereby incorporated by reference herein in its entirety.

What is claimed is:

1. One or more servers for providing services to clients comprising:
    a storage unit which stores a user management table and tenant information, wherein a tenant licensed to provide a service, a user who belongs to the tenant, and a role indicating an access right of the user to a licensed service are registered in the user management table, and wherein the tenant information indicates a license status of a license assigned to the tenant;
    a user interface unit which provides a user interface for setting a role for the user in response to a request from a client belonging to the tenant;
    a first update unit which updates the role in the user management table in accordance with a role to be assigned to the user set via the user interface;
    a receiving unit which receives an instruction to change the license status;
    a change unit which changes the license status to another status based on the received instruction; and
    a second update unit which, upon changing of the license status by the change unit, updates the role of the user belonging to the tenant to which the license has been assigned to a role corresponding to the changed license status,
    wherein the license status includes a processing status that indicates that role updating due to the changing of the license status has not finished despite the fact that the license status has been changed,
    wherein the change unit changes the current license status to the processing status upon receiving the instruction to change the license status, and
    wherein the user interface unit provides a user interface for preventing the user from setting a role for the user if the license status is the processing status.

2. The server according to claim 1,
    wherein
    the second update unit performs role changing by batch processing asynchronously to the changing of the license status.

3. The server according to claim 1,
    wherein the service provided to the client includes at least either a forms management service or a document print service.

4. A cloud system comprising the server according to claim 1 and a client connected to the server via a web.

5. A user management method that is performed by a server that provides a service to a client, the method comprising the steps of:
    storing a user management table and tenant information in a storage unit, wherein a tenant licensed to provide a service, a user who belongs to the tenant, and a role indicating an access right of the user to a licensed service are registered in the user management table, and wherein the tenant information indicates a license status of a license assigned to the tenant;
    providing a user interface for setting a role for the user in response to a request from a client belonging to the tenant;

updating the role in the user management table in accordance with a role to be assigned to the user set via the user interface;

receiving an instruction to change the license status;

changing the license status to another status based on the received instruction; and upon changing of the license status, updating the role of the user belonging to the tenant to which the license has been assigned to a role corresponding to the changed license status, wherein the license status includes a processing status that indicates that role updating due to the changing of the license status has not finished despite the fact that the license status has been changed, wherein the current license status is changed to the processing status upon receiving the instruction to change the license status, and wherein a user interface is provided for preventing the user from performing role settings if the license status is the processing status.

6. A non-transitory computer-readable medium storing a program for causing a computer to execute the user management method according to claim 5.

7. A system comprising a client terminal and a server for providing services to the client, wherein the client terminal transmits a request to the server, and the server comprises:

a storage unit which stores a user management table and tenant information, wherein a tenant licensed to provide a service, a user who belongs to the tenant, and a role indicating an access right of the user to a licensed service are registered in the user management table, and wherein the tenant information indicates a license status of a license assigned to the tenant;

a user interface unit which provides a user interface for setting a role for the user in response to the request from the client belonging to the tenant;

a first update unit which updates the role in the user management table in accordance with a role to be assigned to the user set via the user interface;

a receiving unit which receives an instruction to change the license status;

a change unit which changes the license status to another status based on the received instruction; and a second update unit which, upon changing of the license status by the change unit, updates the role of the user belonging to the tenant to which the license has been assigned to a role corresponding to the changed license status, wherein the license status includes a processing status that indicates that role updating due to the changing of the license status has not finished despite the fact that the license status has been changed, wherein the change unit changes the current license status to the processing status upon receiving the instruction to change the license status, and wherein the user interface unit provides a user interface for preventing the user from setting a role for the user if the license status is the processing status.

8. A method for a system for providing services from a server to a client terminal, the method comprising:

the client terminal transmitting a request to the server; and the server performing the steps of:

storing in a storage unit a user management table and tenant information, wherein a tenant licensed to provide a service, a user who belongs to the tenant, and a role indicating an access right of the user to the licensed service are registered in the user management table, and wherein the tenant information indicates a license status of a license assigned to the tenant;

providing a user interface for setting a role for the user in response to the request from the client terminal belonging to the tenant;

updating the role in the user management table in accordance with a role to be assigned to the user set via the user interface;

receiving an instruction to change the license status;

changing the license status to another status based on the received instruction; and upon changing of the license status, updating the role of the user belonging to the tenant to which the license has been assigned to a role corresponding to the changed status, wherein the license status includes a processing status that indicates that role updating due to the changing of the license status has not finished despite the fact that the license status has been changed, the current license status is changed to the processing status upon receiving the instruction to change the license status, and a user interface for preventing the user from setting a role for the user is provided if the license status is the processing status.

* * * * *